(12) United States Patent
Yao

(10) Patent No.: US 7,064,524 B2
(45) Date of Patent: Jun. 20, 2006

(54) METHOD AND APPARATUS FOR GENERATOR CONTROL

(75) Inventor: Yuan Yao, Mississauga (CA)

(73) Assignee: Honeywell International Inc., Morristown, NJ (US)

( * ) Notice: Subject to any disclaimer, the term of this patent is extended or adjusted under 35 U.S.C. 154(b) by 134 days.

(21) Appl. No.: 10/936,121

(22) Filed: Sep. 8, 2004

(65) Prior Publication Data

US 2006/0049808 A1    Mar. 9, 2006

(51) Int. Cl.
| H02P 9/02 | (2006.01) |
| H02P 9/00 | (2006.01) |
| H02P 9/30 | (2006.01) |
| H02P 7/14 | (2006.01) |
| H02H 7/06 | (2006.01) |

(52) U.S. Cl. .................... 322/25; 322/28; 290/40 A
(58) Field of Classification Search .................. 322/25, 322/28; 290/40 A
See application file for complete search history.

(56) References Cited

U.S. PATENT DOCUMENTS

| 2,511,956 | A | * | 6/1950 | Wetzel ........................ 409/99 |
| 2,648,502 | A | * | 8/1953 | Trofimov ................. 242/414.1 |
| 3,463,998 | A | | 8/1969 | Smith et al. .................. 322/28 |
| 3,605,006 | A | | 9/1971 | Nagae et al. ................. 322/24 |
| 3,902,076 | A | * | 8/1975 | Meyers et al. ................ 307/57 |
| 4,096,429 | A | * | 6/1978 | Carter ........................ 322/28 |
| 4,245,182 | A | | 1/1981 | Aotsu et al. .................. 322/20 |
| 4,623,833 | A | | 11/1986 | Edwards ...................... 322/28 |
| 4,677,394 | A | * | 6/1987 | Vollmer ...................... 331/1 A |
| 4,989,565 | A | * | 2/1991 | Shimomura et al. ...... 290/40 A |
| 5,262,711 | A | | 11/1993 | Mori et al. ................... 322/28 |
| 5,298,851 | A | * | 3/1994 | DeNardis ..................... 322/28 |
| 5,319,302 | A | * | 6/1994 | Koshikawa et al. ........ 323/273 |
| 5,428,299 | A | * | 6/1995 | Koshikawa ................. 324/763 |
| 5,500,710 | A | * | 3/1996 | Saito et al. ................. 396/277 |
| 5,583,420 | A | * | 12/1996 | Rice et al. .................... 322/25 |
| 5,751,158 | A | * | 5/1998 | Loughmiller ............... 324/763 |
| 5,801,516 | A | * | 9/1998 | Rice et al. .................... 322/37 |
| 5,929,609 | A | * | 7/1999 | Joy et al. ..................... 322/25 |
| 6,140,831 | A | * | 10/2000 | Loughmiller ............... 324/765 |
| 6,188,203 | B1 | | 2/2001 | Rice et al. .................... 322/25 |
| 6,384,551 | B1 | | 5/2002 | Watanabe ................... 318/139 |
| 6,696,820 | B1 | | 2/2004 | Peter .......................... 322/24 |
| 6,801,021 | B1 | * | 10/2004 | Morrissette ................. 322/28 |
| 6,927,590 | B1 | * | 8/2005 | Iadanza ...................... 324/763 |
| 6,995,544 | B1 | * | 2/2006 | Sumimoto et al. ........... 322/25 |
| 2002/0097024 | A1 | | 7/2002 | Fury .......................... 322/28 |

FOREIGN PATENT DOCUMENTS

EP    1 422 802 A2    5/2004

* cited by examiner

Primary Examiner—Nicholas Ponomarenko
Assistant Examiner—Pedro J. Cuevas
(74) Attorney, Agent, or Firm—Birch, Stewart, Kolasch & Birch, LLP

(57) ABSTRACT

A generator control circuit is disclosed that includes a first circuit (40) monitoring a generator voltage and producing a first output when the voltage is below a first level, a second circuit (48) monitoring a generator current change rate and producing a second output when the current change rate is above a second level, and a third circuit (13, 28) operatively connected to the first circuit (40) and the second circuit (48) for decreasing a power level supplied to the generator when a plurality of conditions are satisfied, the plurality of conditions including the voltage being below the first level and the current change rate being above the second level. A method of controlling a generator is also disclosed.

19 Claims, 3 Drawing Sheets

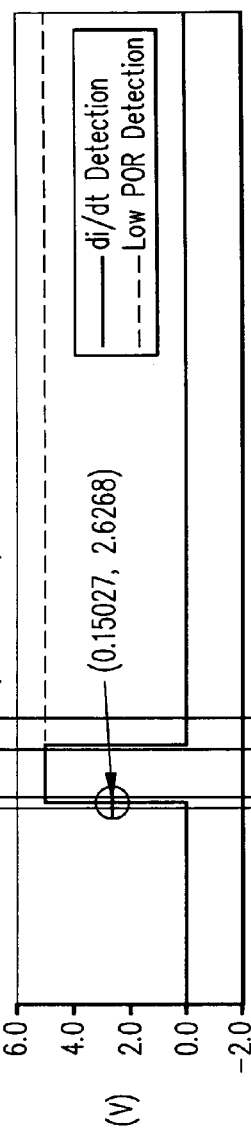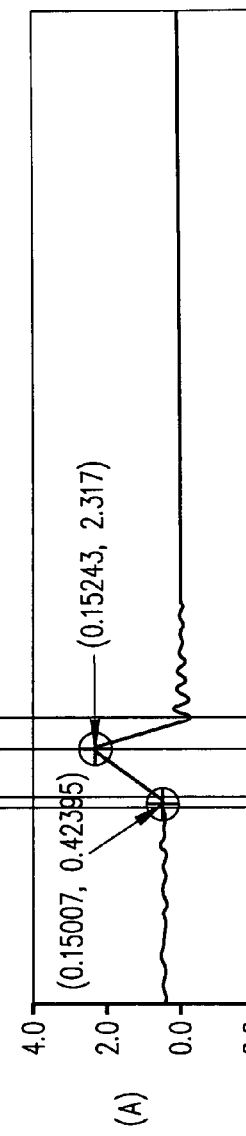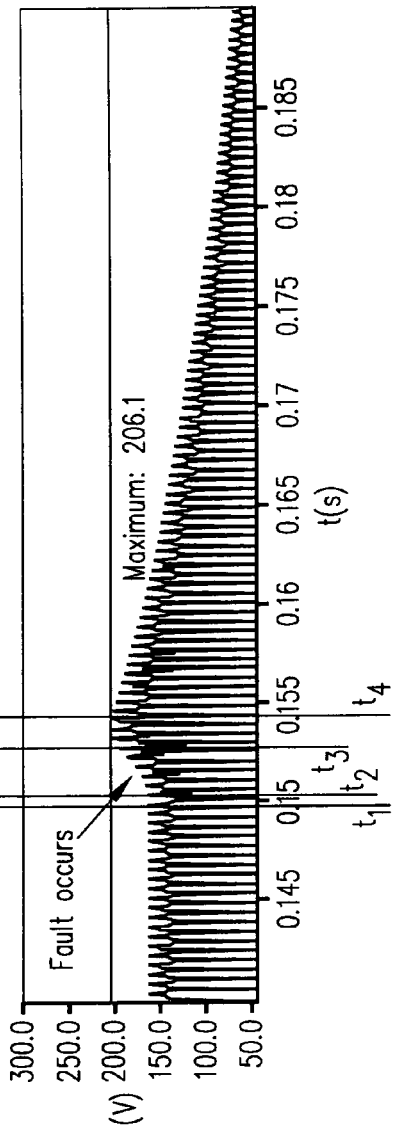
FIG. 2a
FIG. 2b
FIG. 2c
FIG. 2d

METHOD AND APPARATUS FOR GENERATOR CONTROL

FIELD OF THE INVENTION

The present application is directed to a method and apparatus for controlling a generator, and more specifically, toward a method and apparatus for decreasing the power supplied to a generator when voltage regulation is impaired.

BACKGROUND OF THE INVENTION

The output voltage of a generator may be regulated by comparing the voltage at a point of regulation (POR) with a reference voltage and using a voltage regulator to maintain the output voltage at a desired level. One failure mode for such a generator control may be referred to as a "loss of voltage sensing" failure mode. In this failure mode, the voltage regulator detects a voltage of 0 (or a very low voltage) and attempts to increase the generator output to raise the voltage back to the desired level. However, since in fact no feedback is being provided to the voltage regulator, the voltage regulator will continue to increase the generator output, and the generator output voltage will quickly reach dangerously high levels. This may damage equipment connected to the generator. The cause of this failure mode may be, for example, a loose wire providing the voltage feedback to the voltage regulator or a short in the voltage regulating circuit.

This failure mode can cause problems in constant frequency electrical systems. However, the severity of this failure mode is even greater in variable frequency electrical systems such as those sometimes used on aircraft. Such variable frequency electrical systems are becoming increasingly popular because of their overall lighter weight and increased efficiency.

In a variable frequency system, the generator may operate at frequencies nearly twice as high as the frequencies used in constant frequency systems. The higher the frequency at which a generator operates, the shorter the time it will take to reach an overvoltage condition. Therefore, effective protection against this failure mode in variable frequency systems is becoming an important concern.

Some systems now require generators that limit overvoltage to about 150 V rms for 115V AC electrical systems and to 300V rms for 230V AC electrical systems. A conventional approach to overvoltage protection is to monitor voltage levels and disconnect the generator from the power supply when an overvoltage is detected. This approach, however, is too slow to provide effective protection for the above failure mode, especially in a variable frequency system. It is therefore desirable to provide a method and apparatus for addressing this failure mode in a manner that limits generator overvoltage and protects components connected to a generator.

SUMMARY OF THE INVENTION

These problems and others are addressed by the present invention which comprises, in a first embodiment, a generator control circuit that includes a first circuit monitoring a generator voltage and producing a first output when the voltage is below a first level and a second circuit monitoring a generator current change rate and producing a second output when the current change rate is above a second level. A third circuit is operatively connected to the first circuit and the second circuit and decreases power supplied to the generator when a plurality of conditions are satisfied, including the voltage being below the first level and the current change rate being above the second level.

Another aspect of the invention comprises a method of protecting a generator that involves monitoring a generator voltage, monitoring a rate of generator current change, and reducing the generator output when a plurality of conditions are satisfied. The plurality of conditions include: the generator voltage being below a first level and the rate of generator current change being above a second level.

A further aspect of the invention comprises a method of protecting a generator having a field winding connected to a power supply that involves detecting a generator voltage v, detecting a generator current i, and differentiating the generator current i to obtain a quantity di/dt. A number of determinations are then made, including a first determination as to whether v is less than a first value and a second determination as to whether di/dt is greater than a second value. If each of the number of determinations is true, a level of power supplied to the generator is reduced.

Another aspect of the invention comprises a control circuit for a generator that has a field winding and an output and includes a field transistor having a gate connected between the generator field winding and ground. A field controller is connected to the field transistor gate for controlling current flow through the field winding. A detector is provided for determining a generator output voltage and a current change rate in a generator current and producing a first output signal when the voltage is less than a first level and a second output signal when the current change rate is above a second level. A generator controller is provided that is operatively connected to the detector, the generator controller decreasing current flow through the generator field winding upon receipt of the first output signal and the second output signal.

BRIEF DESCRIPTION OF THE DRAWINGS

These features and aspects of the invention will be better understood after a reading of the following detailed description in connection with the below drawings wherein:

FIGS. 2a–2d are graphs illustrating current and voltage levels that result when a simulated loss of voltage sensing fault occurs in a system using the protection circuits of FIG. 1.

DETAILED DESCRIPTION

Figure 1:
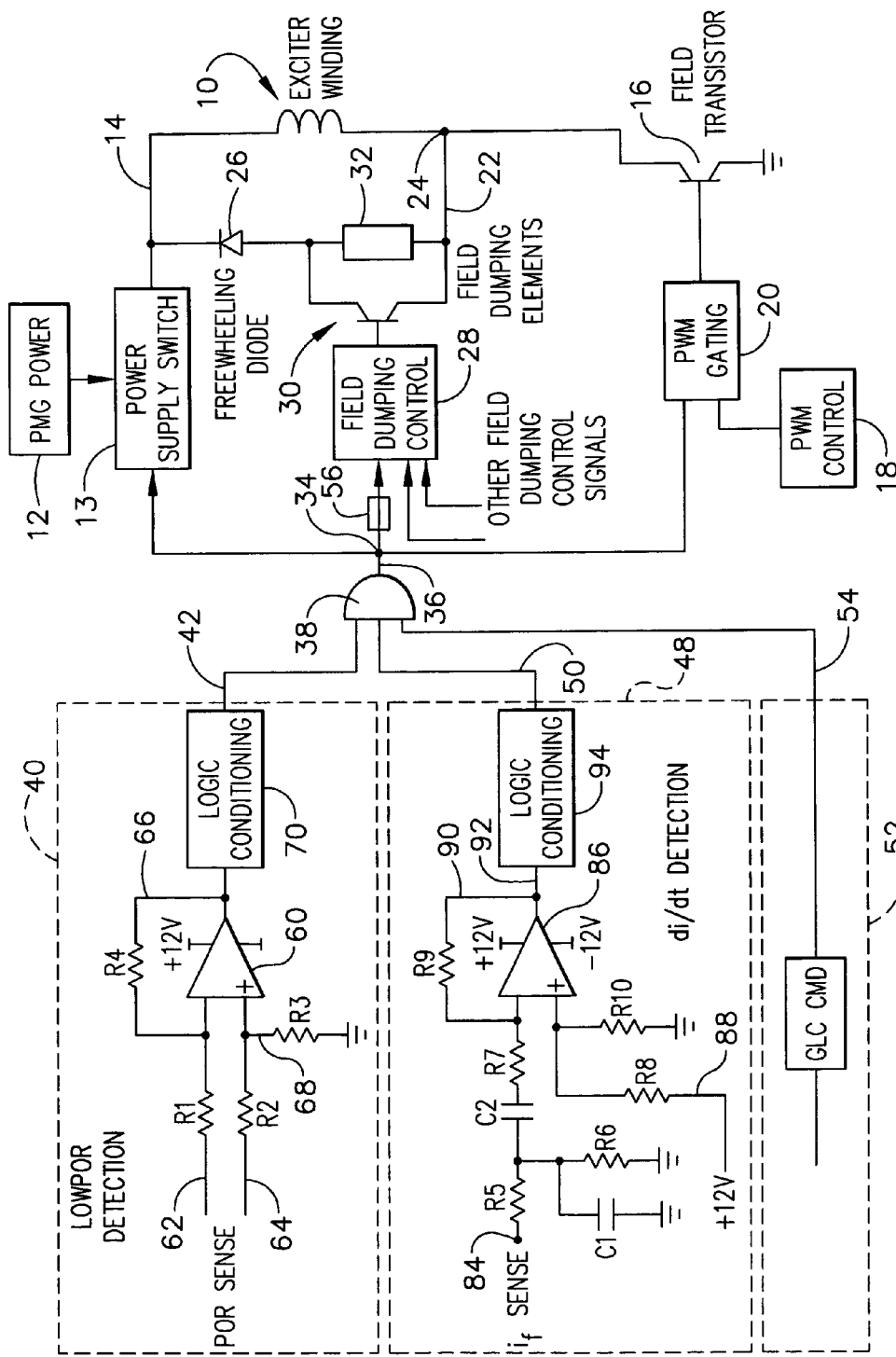
FIG. 1 illustrates, partially schematically, a generator control circuit and detection circuits according to an embodiment of the present invention.

Referring now to the drawings, wherein the showings are for purposes of illustrating preferred embodiments of the invention only and not for the purpose of limiting same, FIG. 1 illustrates a control circuit for a generator (not shown) having an exciter winding 10 connected to a power supply 12 controlled by a switch 13, (preferably a semiconductor switch) by a line 14 and to ground via a field transistor 16. The conductive state of field transistor 16, which is may be, for example, a MOSFET, is regulated by pulse width modulation (PWM) controller 18 via PWM gating 20 to control the output of a generator in a well known manner. A field dumping line 22 connects to a node 24 between exciter winding 10 and field transistor 16. When field transistor 16 is not conducting, current flows from node 24 back to line 14 via freewheeling diode 26. Field dumping control 28 controls transistor 30 to determine a current flow path from node 24 to freewheeling diode 26. When transistor 30 is conducting, current flows through transistor 30 to the freewheeling diode 26, bypassing resistor 32. When transistor 30 is not conducting, current flows through and is dissipated by resistor 32.

The state of power supply switch 13 and field dumping control 28 is determined by the logical state of node 34 on line 36. The signal on line 36 is normally low when the generator is operating in a normal manner. The signal goes high, as described hereinafter, upon the detection of a fault indicative of a loss of voltage sensing, and this turns off or reduces the output of power supply 12.

Three monitoring circuits provide input to an AND gate 38 on line 36 in this embodiment; when all three inputs to gate 38 are logically high, AND gate 38 outputs a logically high signal on line 36. The monitoring circuits include a generator output voltage detection circuit 40 providing an output on voltage detection output line 42, a di/dt monitoring circuit 48 producing an output signal on di/dt output line 50 and a generator line contactor (GLC) monitoring circuit 52 producing an output on GLC line 54.

The present inventor has recognized that a rapid increase in generator current at a time when the generator output voltage is below a nominal level is indicative of a loss of voltage sensing fault. Therefore, di/dt monitoring circuit 48 senses for a rapid change in current levels. Normal system operation may produce a low generator output voltage, such as when the generator operates in current limiting mode or at generator start up, and these conditions should not trigger a fault protection response. Rapid current change when low voltage is detected, however, is a good predictor of a fault that must be addressed.

To prevent normal low voltage conditions from triggering a fault protection sequence, an additional high input to AND gate 38 is required before the fault protection system is triggered. First, output voltage detection circuit 40 monitors the generator output voltage and outputs a logically high signal on voltage detection output line 42 only when the voltage is below a nominal level, such as 5 volts, for example. Likewise, GLC monitoring circuit 52 produces a high output on GLC output line 54 only when the GLC is closed to prevent the triggering of a failure mode when the GLC is open. Thus, when logically high signals appear on voltage detection output line 42, on di/dt output line 50 and on GLC line 54, AND gate 38 produces a logically high signal on line 36, which signal is latched to a high level by latch 56, and triggers a shutdown of the system.

In one embodiment of the invention, output voltage detection circuit 44 comprises a first operational amplifier 60 connected to +12V and −12V power supplies and having a first line 62 connected to the output of a generator (not shown) at the point of regulation (POR) and to the inverting input of first op amp 60 through a first resistor R1, and a second line 64 connected to the output of the generator and the non-inverting input of first op amp 60 through a second resistor R2 where first and second resistors R1 and R2 each have a resistance of, for example, 75 kΩ. (Resistance and capacitance values provided herein are for the purpose of illustrating a suitable example of a protection circuit according to an embodiment of the present invention and are not intended to limit the invention to the use of resistors and capacitors having these values.) A third line 66 provides feedback from the output of the first op amp 60 to the inverting input thereof through a third resistor R3 (1.43 kΩ), while second line 64 is connected to ground thorough a fourth resistor R4 (1.43 kΩ). The output of first op amp 60 on fourth line 68 is conditioned by first logic conditioning circuit 70 which outputs a specific signal, assumed to be logically high for this example, on line 42 when the generator output voltage on first line 62 and on second line 64 is less than 5V.

The di/dt monitoring circuit 48 receives a current input on fifth line 84, which current is normally the generator field winding current. However, in systems where some minimum load is always connected to the generator, the load current can be monitored instead. Fifth line 84 is connected to the inverting input of a second op amp 86. Fifth line 84 includes a fifth resistor R5 (12 kΩ) and is connected to ground at a point between fifth resistor R5 and second op amp 86 via a sixth resistor R6 and a first capacitor C1 (0.22 μF) arranged in parallel. First capacitor C1 filters the incoming signal, and its value should be chosen so that normal noise on fifth line 84 does not trigger di/dt detection circuit 48. Fifth line 84 further includes a second capacitor C2 (0.01 μF) and seventh resistor R7 (50 kΩ) between fifth resistor R5 and the inverting input of second op amp 86. The value of second capacitor C2 determines the sensitivity of the di/dt detector. The non-inverting input of second op amp 86 is connected to a 12V power source by a sixth line 88 through an eighth resistor R8, and sixth line 88 is connected to ground through a tenth resistor R10 (100 kΩ). Seventh line 90 provides feedback from the output of second op amp 86 to the inverting input of second op amp 86 through a ninth resistor R9 (150 kΩ), and the output of second op amp 86 on eighth line 92, which is proportional to the derivative of the current on fifth line 84, is conditioned by second logic conditioning circuit 94 to produce a logically high output on di/dt output line 50 when a current change of a given magnitude is detected.

GLC monitoring circuit 52 provides a logically high output on line 54 when the generator line contactor is closed.

In normal operation, current flow through exciter winding 10 is controlled by field transistor 16 which in turn is controlled by PWM control 18. Generator output voltage is sensed by a generator controller (not shown) and compared with a reference voltage. Adjustments are made to the exciter current based on the sensed generator output voltage. During normal operation, the signal on generator output detection line 42 is low because the output of the generator, detected on first line 62 and second line 64, is more than about 5V. Changes in the derivative of the current when the generator voltage is above about 5V are generally not indicative of a loss of voltage sensing fault. The signal on GLC line 54 is high because the generator line contactor is closed. However, if voltage sensing is lost, the voltage detected on first line 62 and second line 64 will drop to 0 (or below, for example, 5V) which will cause the voltage controller to rapidly increase current to the exciter winding 10 and provide a positive signal on di/dt output line 50. With all three inputs to AND gate 38 high, the shutdown procedure described above will occur.

FIGS. 2a–2d illustrate voltage and current levels during a simulated loss of voltage sensing fault and show how such a fault is handled by the protective circuitry of one embodiment of the present invention. As illustrated in FIG. 2c, generator field current begins to increase at time t1 which produces a positive di/dt as illustrated by the solid line in FIG. 2b. This positive di/dt is detected by di/dt monitoring circuit 48 and causes the signal on di/dt output line 46 to go high. At time t2, about 0.1 msec after the fault occurs, a drop in generator output voltage is seen, which causes the output of voltage detection circuit 40 to go high. At this point all three inputs to AND gate 38 are high, and the output of AND gate 38 becomes logically high at this time as illustrated in FIG. 2a. This high signal activates field dumping control 28 and opens switch 13 to disconnect power supply 12 from line 14 and the exciter winding 10. Field current peaks at time t3, as illustrated in FIG. 2c, and generator output voltage peaks at time t4 at a level of about 206 volts (about 145V rms) for this 115V rms system. As will be appreciated from the above, the fault protection system of this embodiment of the present invention responds quickly to faults that in a previous system would have led rapidly to an overvoltage condition and thus provides improved protection for both the generator and equipment connected thereto.

Figure 3:
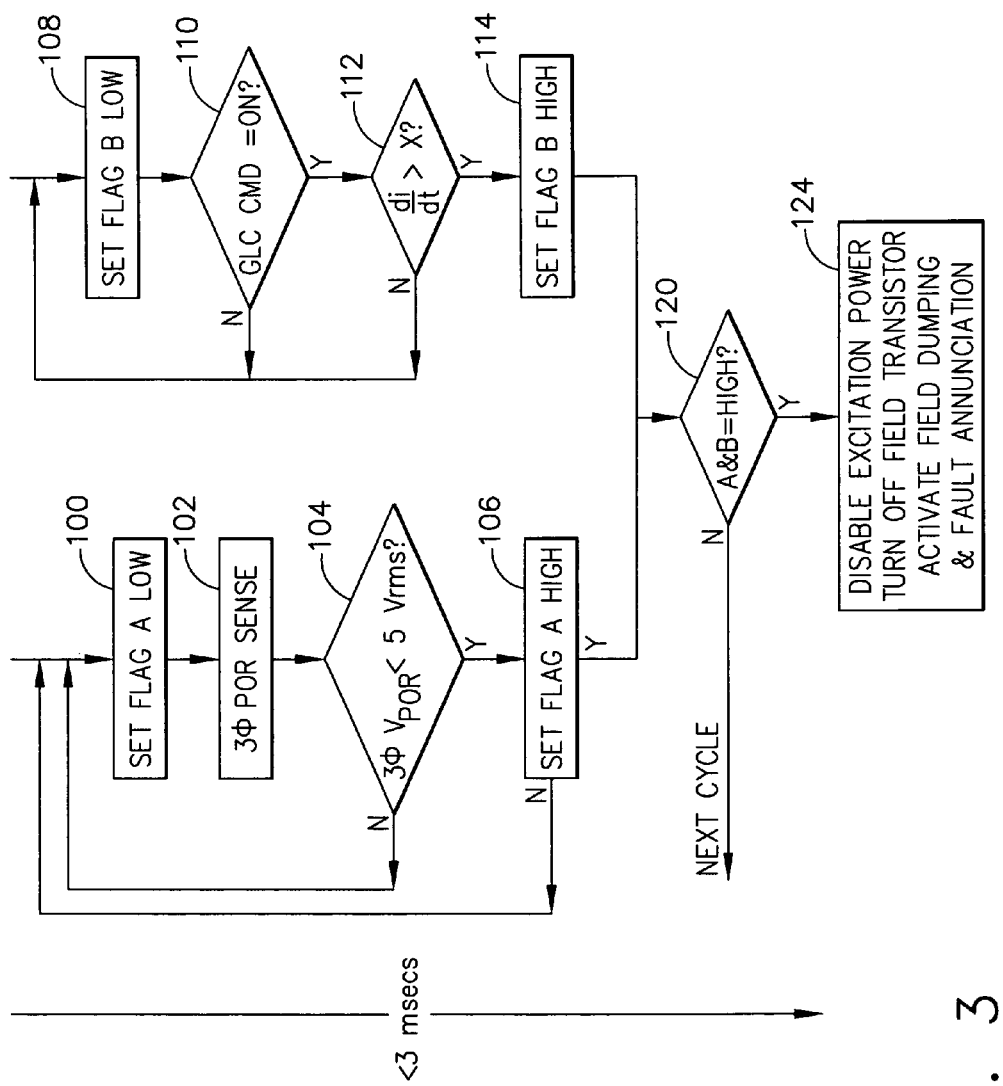
FIG. 3 is a flow chart illustrating the steps followed in performing the method of an embodiment of the present invention.

FIG. 3 illustrates the logical steps followed by the fault protection system of an embodiment of the present invention. At a step 100, a first flag A is set to low and the generator output voltage is sensed at step 102. A determination is made at step 104 as to whether the sensed generator output voltage is less than a predetermined nominal level such as 5 V, for example. If the sensed voltage is greater than this nominal level, the process returns to step 100. If the sensed voltage is less than the nominal level, flag A is set to high at step 106.

Concurrently with steps 100 through 106, steps 108 through 114 are performed. At step 108 a flag B is set to low and a determination is made as to whether the generator line contactor is closed at a step 110. If it is not closed, the process returns to step 108. If the GLC is closed, a determination is made at step 112 as to whether the current is changing more quickly than a certain rate. If such a current rate change is not detected, the process returns to step 108. If the current is changing at more than this rate, flag B is set to high at step 114.

A determination is made at step 120 as to whether both flag A and flag B are high. If both flags are not high, flags A and B are set to low and the two sensing processes described above repeat from steps 100 and 108 respectively. If both flags are high and the generator line contactor is closed, generator excitation power is disabled at step 124.

The invention has been described in terms of a preferred embodiment; however obvious modifications and additions comprises a part of the present invention to the extent they fall within the scope of the several claims appended hereto.

What is claimed is:

1. A generator control circuit comprising:
   a first circuit monitoring a generator voltage and producing a first output when the voltage is below a first level;
   a second circuit monitoring a generator current change rate and producing a second output when the current change rate is above a second level; and
   a third circuit operatively connected to said first circuit and said second circuit for decreasing a power level supplied to the generator when a plurality of conditions are satisfied, said plurality of conditions including said voltage being below the first level and the current change rate being above the second level.

2. The generator control circuit of claim 1 wherein said generator voltage comprises a generator output voltage.

3. The generator control circuit of claim 2 wherein a generator line contactor being closed comprises one of said plurality of conditions.

4. A method of protecting a generator comprising the steps of:
   detecting a generator voltage;
   detecting a rate of generator current change; and
   reducing the generator output when a plurality of conditions are satisfied, the plurality of condition including the generator voltage being below a first level and the rate of generator current change being above a second level.

5. The method of claim 4 wherein a generator line contactor being closed comprises one of the plurality of conditions.

6. A method of protecting a generator having a field winding connected to a power supply comprising the steps of:
   detecting a generator voltage v;
   detecting a generator current i;
   differentiating the generator current i to obtain a quantity di/dt;
   making a number of determinations including a first determination whether v is less than a first value and a second determination whether di/dt is greater than a second value; and
   if each of the number of determinations is true, reducing a level of power supplied to the generator.

7. The method of claim 6 wherein said step of reducing a level of power supplied to the generator comprises the step of reducing current flow through a generator field winding.

8. The method of claim 7 wherein said step of reducing current flow through a generator field winding comprises the step of sending a signal through a first line to a generator field dumping controller.

9. The method of claim 6 wherein said step of reducing current flow through a generator field winding comprises the step of operably disconnecting the generator from a power supply.

10. The method of claim 8 including the additional step of monitoring the first line, and, if a signal is detected, latching the signal to a high state.

11. The method of claim 6 wherein said step of detecting a generator current comprises the step of detecting a generator current in the field winding.

12. The method of claim 6 wherein said step of detecting a generator current comprises the step of detecting a generator output current.

13. The method of claim 6 wherein said step of making a number of determinations comprises the step of making a fourth determination whether a generator line contactor is closed.

14. A control circuit for a generator having a field winding and an output comprising:
   a field transistor having a gate connected between the generator field winding and a ground;
   a field controller connected to the field transistor gate for controlling current flow through the field winding;
   a detector for determining a generator output voltage and a current change rate in a generator current and producing a first output signal when the voltage is less than a first level and a second output signal when the current change rate is above a second level; and
   a generator controller operatively connected to said detector, said generator controller decreasing current flow through said generator field winding upon receipt of said first output signal and said second output signal.

15. The control circuit of claim 14 wherein said generator current comprises a generator output current.

16. The control circuit of claim 14 wherein said generator current comprises a generator field winding current.

17. The control circuit of claim 14 wherein said field transistor comprises a MOSFET.

18. The control circuit of claim 14 wherein detector comprises a first differentiator operably connected to the generator output.

19. The control circuit of claim 14 wherein said generator controller comprises a field dumping control.

* * * * *